(12) United States Patent
Rihan (10) Patent No.: US 11,573,168 B1
(45) Date of Patent: Feb. 7, 2023

(54) MULTIPLE RIG STRESS CORROSION CRACKING TESTING DEVICE

(71) Applicant: KUWAIT INSTITUTE FOR SCIENTIFIC RESEARCH, Safat (KW)

(72) Inventor: Rihan Omar Yousef Rihan, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/713,979

(22) Filed: Apr. 5, 2022

(51) Int. Cl.
*G01N 17/00* (2006.01)
*G01N 3/08* (2006.01)

(52) U.S. Cl.
CPC ............ *G01N 17/002* (2013.01); *G01N 3/08* (2013.01); *G01N 2203/0066* (2013.01); *G01N 2203/024* (2013.01); *G01N 2203/0226* (2013.01); *G01N 2203/0232* (2013.01)

(58) Field of Classification Search
CPC .. G01N 17/002; G01N 3/08; G01N 2203/024; G01N 2203/0226; G01N 2203/0232; G01N 2203/0066; G01N 17/02
USPC .... 73/799, 865.9, 865.6, 826, 832, 834, 835
See application file for complete search history.

(56) References Cited

U.S. PATENT DOCUMENTS

| | | | |
|---|---|---|---|
| 3,139,684 A | | 7/1964 | Boyle |
| 3,381,526 A | * | 5/1968 | Rastogi ..................... G01N 3/32 73/810 |
| 3,427,873 A | * | 2/1969 | Mehdizadeh ............ G01N 3/32 73/809 |
| 5,417,116 A | * | 5/1995 | Solomon ................... G01N 3/32 73/810 |
| 8,474,324 B2 | | 7/2013 | Rihan et al. |
| 9,541,485 B1 | | 1/2017 | Rihan |
| 10,190,967 B1 | * | 1/2019 | Rihan ...................... G01N 3/04 |

FOREIGN PATENT DOCUMENTS

| | | | |
|---|---|---|---|
| CN | 202057572 U | | 11/2011 |
| CN | 107741368 A | | 2/2018 |
| CN | 109490110 A | | 3/2019 |
| KR | 20170081853 | * | 7/2017 |
| RU | 2586256 01 | | 6/2016 |

* cited by examiner

*Primary Examiner* — Robert R Raevis
(74) *Attorney, Agent, or Firm* — Nath, Goldberg & Meyer; Richard C. Litman (57) ABSTRACT

The multiple rig stress corrosion cracking testing device is a stress corrosion cracking and sulfide stress cracking testing device for engineering material specimens. The device includes a pressure and temperature autoclave chamber and also includes four testing rigs for simultaneous stress corrosion cracking testing of a circumferential notched tensile specimen, a compact tension or a double cantilever beam specimen, a cantilever bend specimen, and a center cracked plate specimen under varying experimental conditions. The specimens may be of similar or different materials.

17 Claims, 6 Drawing Sheets

MULTIPLE RIG STRESS CORROSION CRACKING TESTING DEVICE

BACKGROUND

1. Field

The disclosure of the present patent application relates to stress corrosion cracking and sulfide stress cracking testing devices for engineering material specimens, and particularly to a multiple rig stress corrosion cracking testing device.

2. Description of the Related Art

Environmental stress cracking (ESC) is the failure of materials caused by stress and a corrosive environment. Environmental cracking, such as stress corrosion cracking (SCC), and sulfide stress cracking (SSC), are considered to be the most dangerous form of failure in various industries. Stress-corrosion cracking is a time-dependent process wherein a metallurgically susceptible material fractures prematurely due to the combination of a corrosive environment and sustained tensile stress at the metal surface. The tensile stress may be residual stress resulting from heat treatment during fabrication of the metal, developed by external loading, or a combination of these sources. In general, stress corrosion cracking and sulfide stress cracking testing devices apply mechanical stress to material specimens in a corrosive environment/solution. For alloy development, a large number of stress-corrosion specimens need to be evaluated. Tensile specimens may be suitable for alloy development. Specimens can be quantitatively stressed by equipment that applies a constant load, a constant strain, or an increasing load or strain.

Stress corrosion cracking and sulfide stress cracking testing requires equipment to apply corrosive materials to the specimens, while simultaneously applying mechanical stress to the specimens. While devices for applying mechanical stress to multiple specimens are known, devices for simultaneously applying corrosive materials and mechanical stress to multiple specimens are not known.

Thus, a multiple rig stress corrosion cracking testing device solving the aforementioned problems is desired.

SUMMARY

The multiple rig stress corrosion cracking testing device is a fracture mechanics, stress corrosion cracking and sulfide stress cracking testing device for engineering material specimens. The device includes an autoclave chamber (test section) with four testing rigs for simultaneous testing of a circumferential notched tensile (CNT) specimen, a compact tension (CT) or double cantilever beam (DCB) specimen, a cantilever bend (CB) specimen, and a center cracked plate (CCP) specimen, under varying experimental conditions. The autoclave chamber is a pressure vessel for the corrosive solution and is surrounded by an electrically controlled heater for heating the solution. A pressure gauge measures the pressure inside the chamber, and a gas outlet valve and a safety valve, control the pressure in the chamber. In tests that are required to be performed under applied electrical potential, the test section can be equipped with counter and reference electrodes. The autoclave chamber thereby simulates the corrosive environment present in some industries and components, such as pipes, pressure vessels, and reactors, to thereby test the specimens. There can be more than one (up to five) specimen placed in the autoclave chamber, thereby allowing multiple specimens to be tested simultaneously. This saves time, corrosive solution and electrical energy (when heating is required). The test specimens are constructed from the material (metals/alloys) under test and may be fabricated from different materials in order to test different materials simultaneously. The multiple rig stress corrosion cracking testing device is designed to be able to apply various tensile loads to simultaneously test specimens with significantly different geometries. Different corrosive solutions can be used, depending on the corrosive environment to be simulated.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
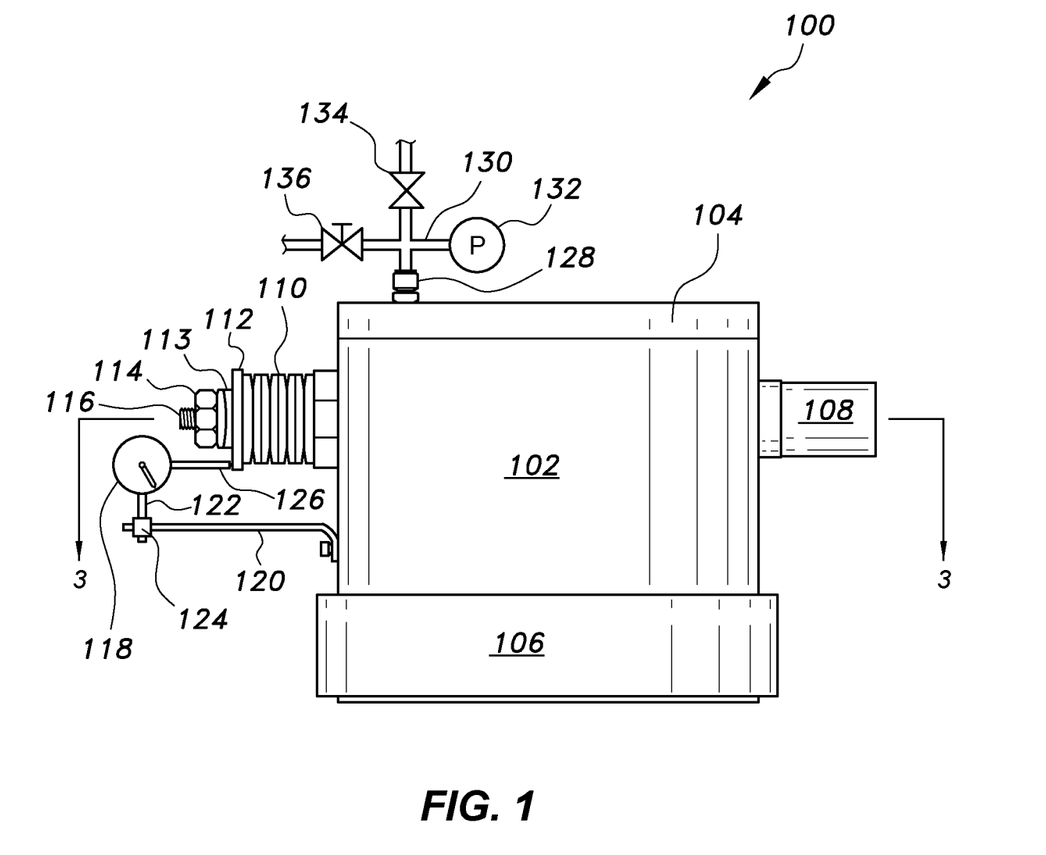
FIG. 1 is a side view of a multiple rig stress corrosion cracking testing device.
Figure 2:
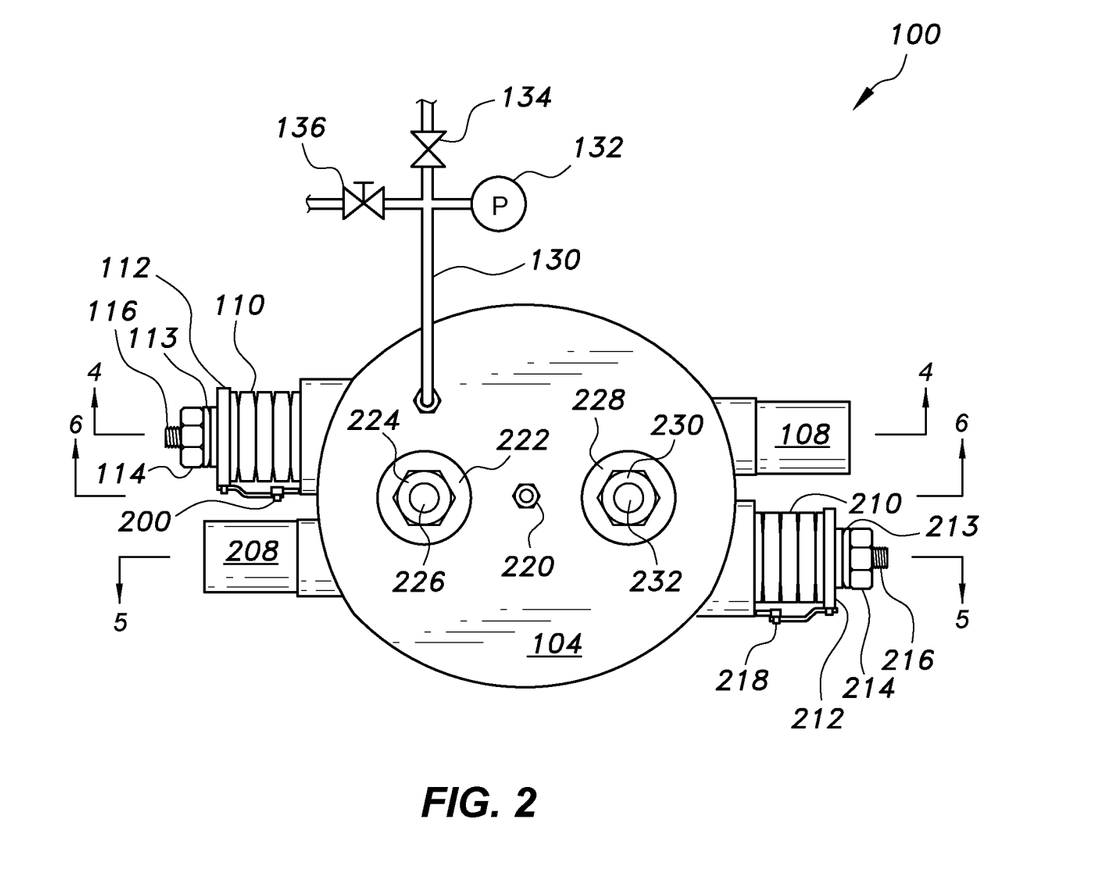
FIG. 2 is a top view of the multiple rig stress corrosion cracking testing device of FIG. 1.

The multiple rig stress corrosion cracking testing device 100 is shown in FIGS. 1-6. As best seen in FIGS. 1-2, the device 100 includes an autoclave chamber 102 that houses four testing rigs for simultaneously testing of a CNT specimen, a CT or DCB specimen, a CB specimen, and a CCP specimen. The specimens may be made of similar or different materials. While the chamber 102 is shown as ovoid in shape, other shapes are possible, although the ovoid shape provides enough room for the four rigs while minimizing the volume of the chamber 102, and therefore the amount of testing solution required. The chamber 102 includes a lid 104, a chamber sidewall 300, a chamber bottom wall 400, an electrical heater 106 surrounding the bottom portion of the chamber sidewall 300, a gas line outlet fitting 128 and a gas line inlet fitting 220. The device 100 further includes a gas inlet line 664 (FIG. 6) connected to the gas line inlet fitting 220; a gas inlet valve 666 for supplying pressurized gas to the gas inlet line 664 from a pressurized gas source (not shown); a gas outlet line 130 connected to the gas line outlet fitting 128; a pressure gauge 132 for measuring the gas pressure in the outlet line 130 (and the chamber 102); a gas safety valve 136 for relieving excessive gas pressure from the outlet line 130 (and the chamber 102); and a gas outlet valve 134 for removing gas from the autoclave chamber 102, as required for simulating environmental testing pressure(s). The autoclave chamber 102 is a pressure vessel acting as a reservoir for the corrosive solution that surrounds the specimens under test. The electrical heater 106 heats the solution, and the gas valves 134, 666 are controlled to provide the pressure to simulate the corrosive environment present in major industrial equipment and components, such as pipes, pressure vessels, and reactors. The gas valve 666 is also used for de-aerating the solution by bubbling gases via tube 662, and the gases escape the autoclave chamber 102 via valve 134.

In FIG. 1, the external portions of the CNT, CB, and CCP testing rigs and other components have been removed for clarity. The details of the CT/DCB testing rig are shown in FIGS. 1-4. The CT/DCB testing rig includes a fixed end with a fixed end holding nut 108 having a threaded bore 304 in its proximate end for receiving the proximate end of a threaded end of a fixed arm 302. The holding nut 108 abuts a fixed end leveling frame 306 that compensates for the curved surface of the chamber sidewall 300. A sealing fitting 308 includes a threaded section 310 on its distal end for screwing the sealing fitting 308 into a threaded bore 312 in the chamber sidewall 300. A fixed shackle 314 is threaded onto the threaded distal end of the fixed arm 302 and includes two aligned bores for receipt of a fixed holding bolt 316, as with most shackles. The fixed holding bolt 316 extends through a first hole in either a DCB specimen (as shown in FIG. 4) or a CT specimen.

The CT/DCB testing rig also includes a loading end with a loading arm 318 with a threaded proximate end 116. A holding/adjusting nut 114 is threaded onto the threaded proximate end 116 of the loading arm 318 and abuts self-aligning washers 113. The distal side of the self-aligning washers 113 abuts a loading disc 112 that is urged in the proximate direction by Belleville washers 110. The distal end of the Belleville washers 110 abuts a leveling frame 326 that compensates for the curved surface of the chamber sidewall 300. A sealing fitting 320 includes a threaded section 322 on its distal end for screwing the sealing fitting 320 into a threaded bore 324 in the chamber sidewall 300. A loading shackle 328 is threaded onto the threaded distal end of the loading arm 318 and includes two aligned bores for receipt of a loading/holding bolt 330, as with most shackles. The loading/holding bolt 330 extends through a second hole in either a DCB specimen DCBS (as shown in FIG. 4) or a CT specimen.

A dial indicator 118 is slidably supported on a horizontal support arm 120 using a vertical support arm 122 and a sliding coupler 124 for horizontal adjustment of an indicator probe 126 that contacts the proximate side of the loading disc 112 for sensing the horizontal position of the loading disc 112. The dial indicator 118 may be replaced by a linear variable differential transformer (LVDT) to provide an electrical signal for reporting the position of the loading disc 112 remotely. A microswitch 200 includes a first arm attached to the proximate side of the leveling frame 326 and a second arm attached to the loading disc 112. An electrical circuit (not shown) may be attached to microswitch 200 for remotely reporting the opening of the microswitch 200 (indicating a considerable opening or complete breaking of the DCB or CT specimen).

Figure 3:
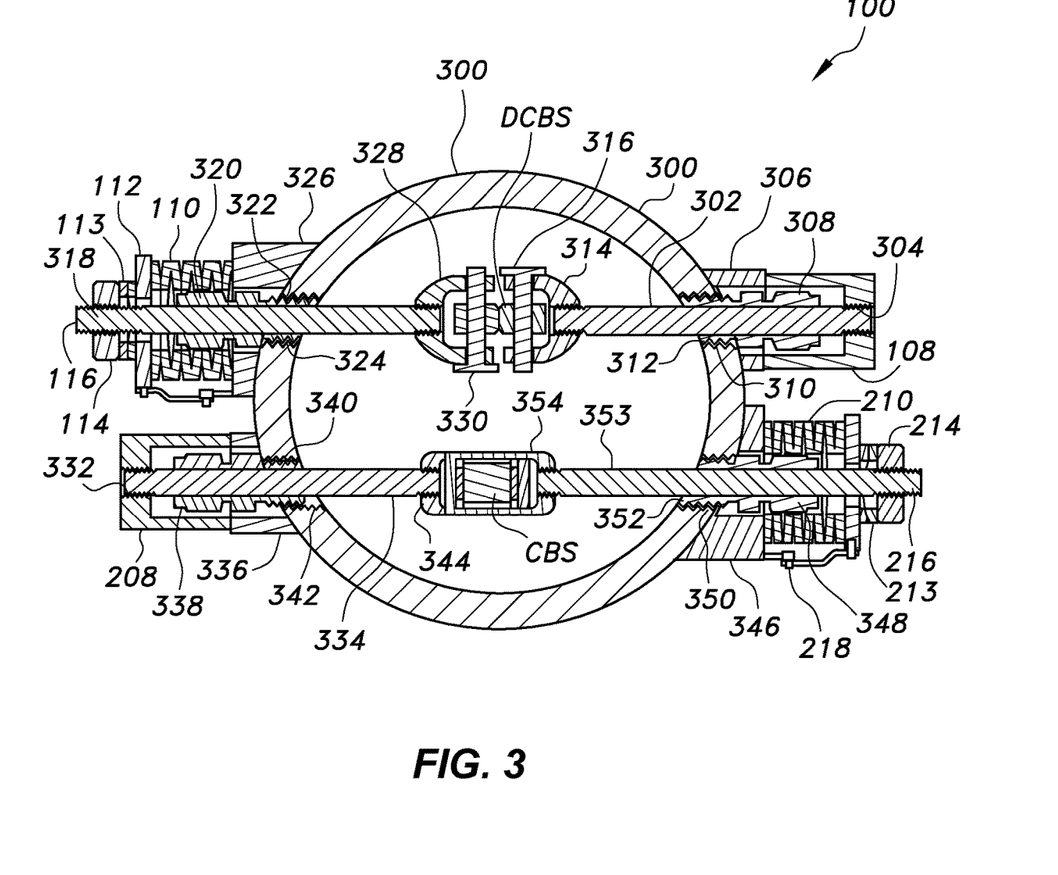
FIG. 3 is a section view taken along lines 3-3 of FIG. 1.
Figure 4:
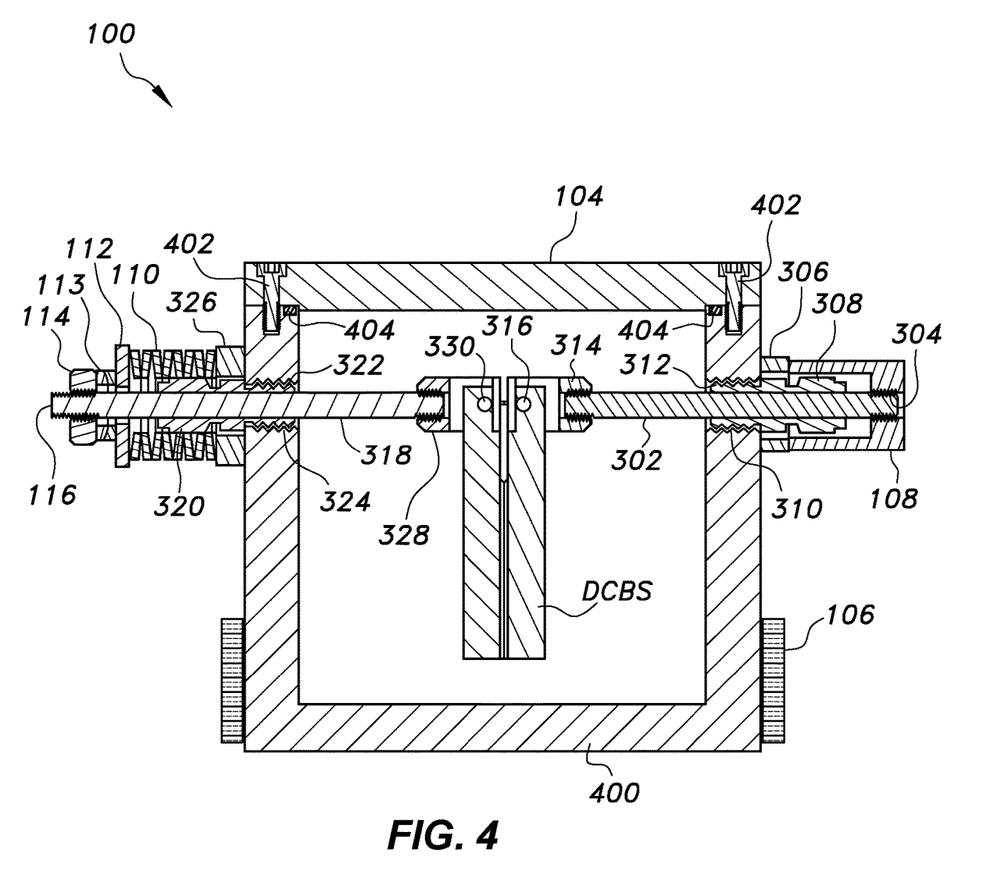
FIG. 4 is a section view taken along lines 4-4 of FIG. 2.
Figure 5:
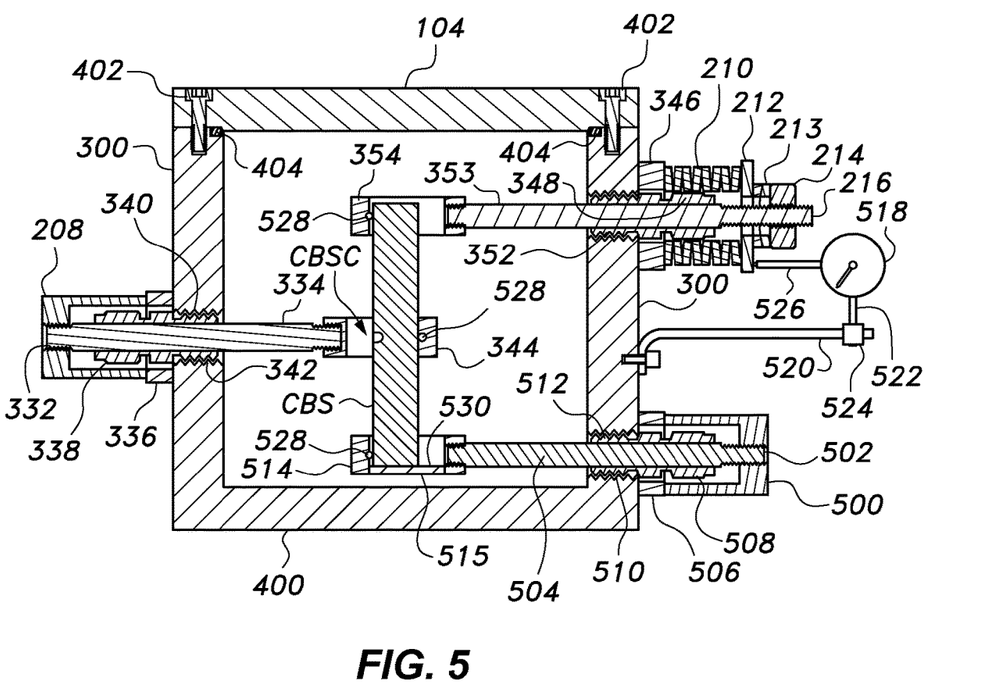
FIG. 5 is a section view taken along lines 5-5 of FIG. 2.

The details of the CB testing rig are shown in FIGS. 2, 3 and 5. The CB testing rig includes a first fixed end with a fixed end holding nut 208 having a threaded bore 332 in its proximate end for receiving the proximate threaded end of a first fixed arm 334. The holding nut 208 abuts a fixed end leveling frame 336 that compensates for the curved surface of the chamber sidewall 300. A sealing fitting 338 includes a threaded section 340 on its distal end for screwing the sealing fitting 338 into a threaded bore 342 in the chamber sidewall 300. A first fixed frame 344 is threaded onto the threaded distal end of the first fixed arm 334 and engages the center of the CB specimen CBS on its non-crack side opposite the crack CBSC in the specimen, as is best seen in FIG. 5.

Also as best seen in FIG. 5, the CB testing rig also includes a second fixed end with a fixed end, holding nut 500 having a threaded bore 502 in its proximate end for receiving the proximate threaded end of a second fixed arm 504. The holding nut 500 abuts a leveling frame 506 that compensates for the curved surface of the chamber sidewall 300. A sealing fitting 508 includes a threaded section 510 on its distal end for screwing the sealing fitting 508 into a threaded bore 512 in the chamber sidewall 300. A second fixed frame 514 is threaded onto the threaded distal end of the second fixed arm 504 and engages the bottom of the CB specimen CBS on the same side of the specimen as the crack CBSC in the specimen.

The CB testing rig also includes a loading end with a loading arm 353 with a threaded proximate end 216. A holding/adjusting nut 214 is threaded onto the threaded proximate end 216 of the loading arm and abuts self-aligning washers 213. The distal side of the self-aligning washers 213 abuts a loading disc 212 that is urged in the proximate direction by Belleville washers 210. The distal end of the Belleville washers 210 abuts a leveling frame 346 that compensates for the curved surface of the chamber sidewall 300. A sealing fitting 348 includes a threaded section 350 on its distal end for screwing the sealing fitting 348 into a threaded bore 352 in the chamber sidewall 300. A loading frame 354 is threaded onto the threaded distal end of the loading arm 353 and engages the top of the CB specimen CBS on the same side as the crack CBSC in the specimen. The first fixed frame 344, the second fixed frame 514 and the loading frame 354 include ceramic insulating cylinders 528 between the frames and the CB specimen CBS. A TEFLON (Teflon is a registered trademark of The Chemours Company, FC, LLC, referring to materials having a coating of polytetrafluoroethylene [PTFE]) insulating sheet 530 is positioned between the bottom of CB specimen CBS and a bottom supporting plate 515 of the second fixed frame 514. The ceramic insulating cylinders and PTFE insulating sheet 530 are used as electrical insulators between the CB specimen and the loading/fixed frames in order to avoid galvanic corrosion.

A dial indicator 518 is slidably supported on a horizontal support arm 520 using a vertical support arm 522 and a sliding coupler 524, for horizontal adjustment of an indicator probe 526 that contacts the proximate side of the loading disc 212, for sensing the horizontal position of the loading disc 212. The dial indicator 518 may be replaced by a linear variable differential transformer (LVDT) to provide an electrical signal for reporting the position of the loading disc 212 remotely. A microswitch 218 includes a first arm attached to the proximate side of the leveling frame 346 and a second arm attached to the loading disc 212. An electrical circuit (not shown) may be attached to microswitch 218 for remotely reporting the opening of the microswitch 218 (indicating a complete breaking of the CB specimen CBS).

Figure 6:
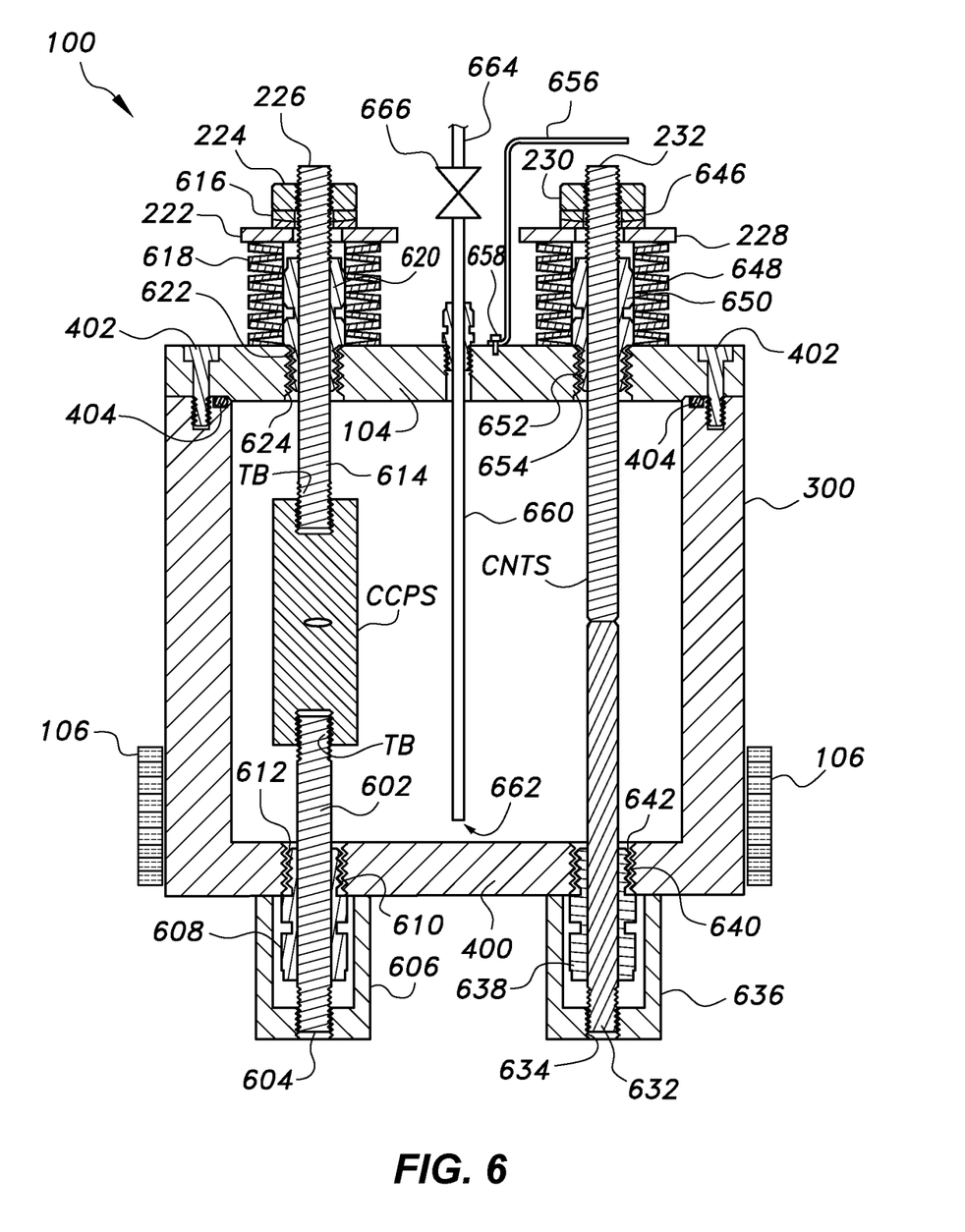
FIG. 6 is a section view taken along lines 6-6 of FIG. 2.

The details of the CCP testing rig are shown in FIGS. 2 and 6. The CCP testing rig includes a fixed lower end with a fixed end, holding nut 606 having a threaded bore 604 in its proximate end for receiving the proximate threaded end of a fixed arm 602. The distal end of the holding nut 606 abuts the bottom surface of the bottom wall 400. A leveling frame is not required, as the bottom surface of the bottom wall 400 is relatively flat. A sealing fitting 608 includes a threaded section 610 on its distal end for screwing the sealing fitting 608 into a threaded bore 612 in the bottom wall 400. The CCP specimen CCPS is modified to include threaded bores TB. The fixed arm 602 includes a threaded distal end that is screwed into the lower threaded bore TB of the CCP specimen CCPS.

The CCP testing rig also includes a loading end with a loading arm 614 with a threaded proximate end 226. A holding/adjusting nut 224 is threaded onto the threaded proximate end 226 of the loading arm 614 and abuts self-aligning washers 616. The distal side of the self-aligning washers 616 abuts a loading disc 222 that is urged in the proximate direction by Belleville washers 618. The distal end of the Belleville washers 618 abuts the top surface of the lid 104. A leveling frame is not required, as the top surface of the lid 104 is relatively flat.

A sealing fitting 620 includes a threaded section 622 on its distal end for screwing the sealing fitting 620 into a threaded bore 624 in the lid 104. The loading arm 614 includes a threaded distal end that is screwed into the upper threaded bore TB of the CCP specimen CCPS.

As with the CT/DCB and CB testing rigs, the CCP testing rig may also include a microswitch (not shown) and electrical circuit (not shown) for remotely reporting the opening of the microswitch (indicating a complete breaking of the CCP specimen).

The details of the CNT testing rig are shown in FIGS. 2 and 6. A circumferential notched tensile (CNT) specimen CNTS is modified to include threaded end portions 632 and 232. The CNT testing rig includes a fixed lower end with a fixed end holding nut 636 having a threaded bore 634 in its proximate end for receiving the fixed threaded end portion 632 of the modified CNT specimen CNTS. The distal end of the holding nut 636 abuts the bottom surface of the bottom wall 400. A leveling frame is not required, as the bottom surface of the bottom wall 400 is relatively flat. A sealing fitting 638 includes a threaded section 640 on its distal end for screwing the sealing fitting 638 into a threaded bore 642 in the bottom wall 400.

The CNT testing rig also includes a loading end with a holding/adjusting nut 230 that is threaded onto the loading threaded end portion 232 of the modified CNT specimen CNTS and abuts self-aligning washers 646. The distal side of the self-aligning washers 646 abuts a loading disc 228 that is urged in the proximate direction by Belleville washers 648. The distal end of the Belleville washers 648 abuts the top surface of the lid 104. A leveling frame is not required, as the top surface of the lid 104 is relatively flat. A sealing fitting 650 includes a threaded section 652 on its distal end for screwing the sealing fitting 650 into a threaded bore 654 in the lid 104.

As with the CT/DCB and CB testing rigs, the CNT testing rig may also include a microswitch (not shown) and electrical circuit (not shown) for remotely reporting the opening of the microswitch (indicating a complete breaking of the CNT specimen). In addition, the CNT testing rig also includes a curved safety arm 656 that is attached to the top surface of the lid 104 by a screw 658 (for example) and extends over the top of the loading end of the CNT testing rig. The safety arm 656 ensures that the broken upper half of the modified CNT specimen CNTS does not become a dangerous projectile.

In operation, the Belleville spring washers are compressed using a loading machine. After assembling the rigs with the specimens, the Belleville spring washers are loaded on the rigs and the holding/adjusting nuts are adjusted, and the applied machine load is removed. The stored energy in the spring washers is transmitted to the specimens as tensile loads via the loading arms and loading frames, or directly to the specimens. The loading/holding shackles and loading/holding frames can be eliminated by screwing the loading arm directly to the specimen, as with the modified CCP specimen CCPS. The self-alignment washers are used to maintain the applied tensile load in alignment axially with the specimen. The microswitches are connected to time counters (not shown) through their respective electrical circuits. At the start of the experiment and before the specimens break, the microswitches will be closed and the timer is started manually. Once a specimen breaks, the respective loading discs moves outwardly opens the respective microswitch and the respective time counter stops counting and indicates the time to failure of the respective specimen.

The autoclave chamber 102, and the lid 104 of the multiple rig stress corrosion cracking testing device 100 are constructed from a corrosion-resistant material, such as high-nickel alloys (e.g., HASTELLOY® C-276 alloy); a nickel-copper alloy (e.g., Monel 400); a nickel-chromium alloy (e.g., Inconel® 600 (AMS 5540)); or 316 stainless steel.

It is to be understood that the multiple rig stress corrosion cracking testing device is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A multiple rig stress corrosion cracking testing device, comprising:
    a housing made of corrosion-resistant material defining an autoclave chamber, the autoclave chamber having a top lid having a top surface, a bottom wall having a bottom surface, and an arcuate sidewall extending circumferentially between the top lid and the bottom wall;
    a first stress corrosion cracking testing rig, the first stress corrosion cracking testing rig being configured to support and stress a first specimen extending vertically within the autoclave chamber between the top lid and the bottom wall; and
    a second stress corrosion cracking testing rig, the second stress corrosion cracking testing rig being configured to support and stress a second specimen extending vertically within the autoclave chamber between the top lid and the bottom wall, the first and the second stress corrosion cracking testing rigs each being configured to support and stress a corresponding specimen selected from the group consisting of circumferential notched tensile specimens, compact tension specimens, double cantilever beam specimens, cantilever bend specimens, and center cracked plate specimens, the first and second stress corrosion cracking testing rigs each having:
        a fixed end having a holding nut, the holding nut having a proximate end defining a threaded bore and a distal end abutting the bottom surface of the bottom wall, the holding nut being adapted for holding a lower axial end of a specimen under test in fixed relation to the bottom wall of the autoclave chamber during the test; and
        a loading end having a holding/adjusting nut, spring washers abutting the top lid of the autoclave chamber external to the autoclave chamber, and a loading disc disposed between the holding/adjusting nut and the spring washers, the loading disc being adapted for having a tensile load applied thereto by a loading machine, the holding/adjusting nut being adjusted to transfer the applied measured tensile load to an upper axial end of the specimen under test through the spring washers after the loading machine is removed.

2. The multiple rig stress corrosion cracking testing device as recited in claim 1, further comprising a third stress corrosion cracking testing rig, the third stress corrosion cracking testing rig being configured to support and stress a third specimen extending horizontally within the autoclave chamber, the first, second and third stress corrosion cracking testing rigs being configured to support and stress specimens chosen from the group consisting of circumferential notched tensile specimens, compact tension specimens, double cantilever beam specimens, cantilever bend specimens, and center cracked plate specimens.

3. The multiple rig stress corrosion cracking testing device as recited in claim 2, further comprising a fourth stress corrosion cracking testing rig, the fourth stress corrosion cracking testing rig being configured to support and stress a fourth specimen extending within the autoclave chamber, the first, second, third and fourth stress corrosion cracking testing rigs being configured to support and stress specimens chosen from the group consisting of circumferential notched tensile specimens, compact tension specimens, double cantilever beam specimens, cantilever bend specimens, and center cracked plate specimens.

4. The multiple rig stress corrosion cracking testing device as recited in claim 3, wherein the third and fourth stress corrosion cracking testing rigs each comprise:
   a fixed end having a holding nut, the holding nut having a proximate end having a threaded bore and a distal end; and
   a fixed end leveling frame, the fixed end leveling frame being positioned between the distal end of the holding nut and the arcuate sidewall of the autoclave chamber external to the autoclave chamber;
   a loading end having a holding/adjusting nut, a loading disc, spring washers, and a loading end leveling frame, the loading disc being positioned between the holding/adjusting nut and the spring washers and the loading end leveling frame being positioned between the spring washers and the autoclave chamber sidewall external to the autoclave chamber.

5. The multiple rig stress corrosion cracking testing device as recited in claim 4, wherein the third and fourth stress corrosion cracking testing rigs each comprise:
   a fixed arm having a threaded proximate end and a threaded distal end, the fixed arm extending through the fixed end leveling frame, the holding nut at the fixed end being screwed onto the threaded proximate end of the fixed arm; and
   a loading arm having a threaded proximate end and a threaded distal end, the loading arm extending through the autoclave chamber sidewall, the loading end leveling frame, the spring washers, and the loading disc, the holding/adjusting nut at the loading end being threaded onto the threaded proximate end of the loading arm.

6. The multiple rig stress corrosion cracking testing device as recited in claim 5, wherein the third specimen is either a compact tension specimen or a double cantilever beam specimen, the third stress corrosion cracking testing rig further comprising:
   a fixed shackle threaded onto the threaded distal end of the fixed arm of the third stress corrosion cracking rig, the fixed shackle having two aligned bores and a holding bolt extending through the two aligned bores in the fixed shackle; and
   a loading shackle threaded onto the threaded distal end of the loading arm, the loading shackle having two aligned bores and a loading/holding bolt extending through the two aligned bores in the loading shackle.

7. The multiple rig stress corrosion cracking testing device as recited in claim 6, wherein the third specimen has a first hole and a second hole defined therein, the fixed shackle holding bolt extending through the first hole in the third specimen and the loading/holding bolt extending through the second hole in the third specimen, whereby the multiple rig stress corrosion cracking testing device may test a center crack plate specimen, a circumferential notched tensile specimen, and a compact tension specimen or a double cantilever beam specimen for stress corrosion cracking simultaneously.

8. The multiple rig stress corrosion cracking testing device as recited in claim 7, wherein the fourth specimen is a cantilever bend specimen having upper and lower axial ends and a pretesting crack defined in the fourth specimen between the upper and lower axial ends, the fourth stress corrosion cracking testing rig further comprising:
   a first fixed frame threaded onto the threaded distal end of the fixed arm inside the autoclave chamber, the first fixed frame supporting the fourth specimen at the pretesting crack;
   a loading frame threaded onto the threaded distal end of the loading arm inside the autoclave chamber, the loading frame supporting the upper axial end to the fourth specimen; and
   a second fixed end having:
      a second holding nut, the second holding nut having a proximate end and a distal end, the proximate end defining a threaded bore;
      a second fixed end leveling frame, the second fixed end leveling frame being positioned between the distal end of the holding nut at the second fixed end and the arcuate autoclave chamber sidewall;
      a second fixed arm having a threaded proximate end and a threaded distal end, the second fixed arm extending through the second fixed end leveling frame, the second holding nut being mounted on the threaded proximate end of the second fixed arm; and
      a second fixed frame threaded onto the threaded distal end of the second fixed arm inside the autoclave chamber, the second fixed frame supporting the lower axial end of the fourth specimen;
   whereby an adjustable tensile load applied to the loading arm tests the cantilever bend specimen for stress corrosion cracking, and whereby the multiple rig stress corrosion cracking testing device is capable of testing any combination of four specimens simultaneously for stress corrosion cracking, the four specimens being selected from the group consisting of a center cracked plate specimen, a circumferential notched tensile specimen, a cantilever bend specimen, a double cantilever bend specimen, and a compact tension specimen.

9. The multiple rig stress corrosion cracking testing device as recited in claim 8, further comprising:
   a first ceramic insulating cylinder disposed between the first fixed frame and the fourth specimen;
   a second ceramic insulating cylinder disposed between the second fixed frame and the fourth specimen; and
   a third ceramic insulating cylinder disposed between the loading frame and the fourth specimen.

10. The multiple rig stress corrosion cracking testing device as recited in claim 9, wherein the second fixed frame further comprises:
    a bottom supporting plate for supporting the fourth specimen; and
    a polytetrafluoroethylene insulating sheet disposed between the bottom supporting plate and the bottom of the fourth specimen.

11. The multiple rig stress corrosion cracking testing device as recited in claim 4, further comprising means for sensing a position of the loading disc relative to the loading end leveling frame.

12. The multiple rig stress corrosion cracking testing device as recited in claim 11, wherein the means for sensing the position of the loading disc relative to the loading end leveling frame comprises a microswitch.

13. The multiple rig stress corrosion cracking testing device as recited in claim 1, further comprising means for sensing a position of the loading disc relative to the top surface of the top lid of the autoclave chamber.

14. The multiple rig stress corrosion cracking testing device as recited in claim 13, wherein the means for sensing the position of the loading disc relative to the top surface of the lid comprises a microswitch.

15. The multiple rig stress corrosion cracking testing device as recited in claim 1, wherein:
   the first specimen is a circumferential notched tensile specimen having externally threaded upper and lower axial ends, the first stress corrosion cracking testing rig being a circumferential notched tensile testing rig;
   the holding nut at the fixed end of the first stress corrosion cracking testing rig is threaded onto the externally threaded lower axial end of the first specimen; and
   the holding/adjusting nut at the loading end of the first stress corrosion cracking testing rig is threaded onto the externally threaded upper axial end of the first specimen.

16. The multiple rig stress corrosion cracking testing device as recited in claim 15, wherein the second specimen is a center cracked plate specimen having upper and lower axial ends and an internally threaded bore defined in the upper and lower axial ends, the second stress corrosion cracking testing rig being a center cracked plate testing rig, the second stress corrosion cracking testing rig further comprising:
   a fixed arm having a threaded proximate end and a threaded distal end, the threaded proximate end of the fixed arm being threaded into the holding nut at the fixed end of the center cracked plate testing rig and the threaded distal end of the fixed arm being threaded into the internally threaded bore in the lower axial end of the center cracked plate specimen; and
   a loading arm having a threaded proximate end and a threaded distal end, the threaded proximate end of the loading arm being threaded into the holding/adjusting nut at the loading end of the center cracked plate testing rig and the threaded distal end of the loading arm being threaded into the internally threaded bore in the upper axial end of the center cracked plate specimen whereby a circumferential notched tensile specimen and a center cracked plate specimen may be tested for stress corrosion cracking simultaneously in the multiple stress corrosion cracking testing device.

17. The multiple rig stress corrosion cracking testing device as recited in claim 1, further comprising means for heating and pressurizing the autoclave chamber.

* * * * *